US009802442B2

United States Patent
Tanaka et al.

(10) Patent No.: US 9,802,442 B2
(45) Date of Patent: Oct. 31, 2017

(54) HEAVY DUTY TIRE

(71) Applicant: Sumitomo Rubber Industries, Ltd., Kobe-shi, Hyogo (JP)

(72) Inventors: Kaori Tanaka, Kobe (JP); Daisuke Todoroki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 321 days.

(21) Appl. No.: 14/559,651

(22) Filed: Dec. 3, 2014

(65) Prior Publication Data

US 2015/0174965 A1    Jun. 25, 2015

(30) Foreign Application Priority Data

Dec. 24, 2013  (JP) ................................. 2013-265790

(51) Int. Cl.
*B60C 11/00* (2006.01)
*B60C 11/01* (2006.01)
(Continued)

(52) U.S. Cl.
CPC .......... *B60C 11/01* (2013.01); *B60C 11/0083* (2013.01); *B60C 11/0332* (2013.01);
(Continued)

(58) Field of Classification Search
CPC ......... B60C 11/0083; B60C 2011/0348; B60C 11/0332; B60C 11/04
See application file for complete search history.

(56) References Cited

U.S. PATENT DOCUMENTS 4,442,879 A *  4/1984  Uemura ................. B29D 30/00
                                        152/209.14
5,616,195 A *  4/1997  Marquet ............... B60C 9/2009
                                        152/209.14
(Continued)

FOREIGN PATENT DOCUMENTS

DE    10 2009 049500 A1    4/2010
EP       0 269 301 A1      6/1988
(Continued)

OTHER PUBLICATIONS

Machine translation for Japan 63-134313 (no date).*

*Primary Examiner* — Steven D Maki
(74) *Attorney, Agent, or Firm* — Birch, Stewart, Kolasch & Birch, LLP (57) ABSTRACT

A heavy duty tire has a carcass extending from a tread portion to a bead core in a bead portion through a sidewall portion, and a belt layer disposed on the outside of the carcass in the tire radial direction and on the inside of the tread portion. In a state in which a distance between a pair of bead heels is kept at 110% of a wheel rim width of a standard wheel rim and no inner pressure is applied, the contour shape of the tread portion is formed by a 1st circular arc having a center on the tire equatorial plane, and a pair of 2nd circular arcs, disposed on both outsides of the 1st circular arc in the tire axial direction. The radius of the 2nd circular arc is more than the radius R1 of the 1st circular arc. One 2nd circular arc has the center on the other 2nd circular arc side of the tire equator in the tire axial direction, and the other 2nd circular arc has the center on the one 2nd circular arc side of the tire equator in the tire axial direction.

7 Claims, 5 Drawing Sheets

(51) Int. Cl.
*B60C 11/04* (2006.01)
*B60C 11/03* (2006.01)

(52) U.S. Cl.
CPC ..... *B60C 11/042* (2013.01); *B60C 2011/0348* (2013.01); *B60C 2200/06* (2013.01)

(56) References Cited

U.S. PATENT DOCUMENTS

| | | | | |
|---|---|---|---|---|
| 5,647,925 | A | * | 7/1997 | Sumiya ............... B60C 3/04 152/209.14 |
| 5,896,905 | A | | 4/1999 | Lurois |
| 6,866,734 | B1 | * | 3/2005 | Ridha ................ B60C 9/2006 152/525 |
| 2004/0079460 | A1 | * | 4/2004 | Maruoka ............ B60C 9/18 152/209.14 |
| 2007/0151643 | A1 | * | 7/2007 | Takahashi ........... B60C 11/01 152/209.1 |
| 2010/0096060 | A1 | | 4/2010 | Suzuki |

FOREIGN PATENT DOCUMENTS

| | | | |
|---|---|---|---|
| EP | 269301 A1 | * | 6/1988 |
| EP | 0 384 182 A1 | | 8/1990 |
| GB | 2 198 996 A | | 6/1988 |
| JP | 63-134313 A | * | 6/1988 |
| JP | 7-164823 A | | 6/1995 |
| WO | WO 97/07996 A1 | | 3/1997 |

* cited by examiner

HEAVY DUTY TIRE

TECHNICAL FIELD

The present invention relates to a heavy duty tire capable of preventing uneven wear.

BACKGROUND ART

In general, a contour shape of a tread portion of a heavy duty tire in a tire meridian section under a state applied by no inner pressure is formed by a single circular arc.

If such a tire is mounted on a rim and applied by an inner pressure, the expansion of the tread portion becomes different between the vicinity of the tire equator and the vicinity of a tread ground contact edge, and so called shoulder dropping phenomenon is caused in the contour of the tread portion.

In a tread portion where a shoulder dropping phenomenon occurs, the ground pressure at the tread ground contact edge becomes insufficient, and partial uneven wear called shoulder wear is liable to occur.

Since a tire in which uneven wear has occurred becomes a cause of vibrations of the car, the tire is uninstalled early, and a sufficient tire life can not be obtained.

Therefore, in order to prevent the above-mentioned shoulder wear, a heavy duty tire in which the contour shape of the tread portion is formed by a 1st circular arc having a center on the tire equatorial plane and a 2nd circular arc disposed axial outside the 1st circular arc and having a radius larger than the 1st circular arc, has been disclosed in the following patent document 1 for example.

PRIOR ART DOCUMENT

Patent Document

[Patent document 1] Japanese Patent Application Publication No. H07-164823

However, in the heavy duty tire disclosed in the above-mentioned patent document 1, the 1st circular arc and the 2nd circular arc intersect and are connected with each other at an edge of a main groove, and the intersecting point P1 becomes a tangible inflection point. Such inflection point of the tread portion is unremedied and remained even when the inner pressure is applied. Thus, there is a possibility that local slippage occurs in the vicinity of the inflection point during running, and uneven wear is induced. Accordingly, a further improvement to fully prevent the occurrence of uneven wear is expected.

SUMMARY OF INVENTION

Technical Problem

The present invention was made with the view to the above-mentioned actual circumstances, and a primary object is to provide a heavy duty tire capable of preventing the occurrence of uneven wear.

Solution to Problem

The present invention is a heavy duty tire provided with a carcass extending from a tread portion to bead cores in bead portions through sidewall portions, and a belt layer composed of a plurality of belt plies disposed in the tread portion and on the outside of the carcass in the tire radial direction and characterized in that under a state in which a distance between a pair of bead heels of the tire is kept at 110% of a wheel rim width of a standard wheel rim and no inner pressure is applied, a contour shape of the tread portion in a tire meridian section is formed by a 1st circular arc having a center on the tire equatorial plane, and a pair of 2nd circular arcs disposed on both outsides of the 1st circular arc in the tire axial direction, the radius R2 of the 2nd circular arc is more than the radius R1 of the 1st circular arc, one 2nd circular arc has a center on the other 2nd circular arc side of the tire equator in the tire axial direction, and the other 2nd circular arc has a center on the one 2nd circular arc side of the tire equator in the axial direction.

In the heavy duty tire according to the present invention, it is preferable that the ratio R2/R1 of the radius R2 of the 2nd circular arc and the radius R1 of the 1st circular arc is 1.20 to 2.20.

In the heavy duty tire according to the present invention, it is preferable that, in a normal state in which the tire is mounted on the standard wheel rim and applied by a standard inner pressure, a contour shape of the tread portion in a tire meridian section is formed by a 3rd circular arc having a center on the tire equatorial plane and on the inside of the tread portion in a tire radial direction, and a 4th circular arc disposed on the outside of the 3rd circular arc in the tire axial direction and having a center on the inside of the tread portion in the tire radial direction, and the ratio R4/R3 of the radius R4 of the 4th circular arc and the radius R3 of the 3rd circular arc is 1.05 to 1.25.

In the heavy duty tire according to the present invention, it is preferable that the tread portion is partitioned into a plurality of land portions by a plurality of main grooves extending in the tire circumferential direction, a plurality of the land portions include a shoulder land portion outermost in the tire axial direction, when the tire mounted on the standard wheel rim and applied by the standard inner pressure is loaded with a standard load and ground-contacted with a flat surface at the camber angle of zero degree, the ratio CLo/CLi of a ground contacting length CLo of an outer edge in the tire axial direction of the shoulder land portion and a ground contacting length CLi of an inner edge in the tire axial direction of the shoulder land portion is 0.95 to 1.05.

In the heavy duty tire according to the present invention, it is preferable that the tread portion is partitioned into a plurality of land portions by a plurality of main grooves extending in the tire circumferential direction, a plurality of the land portions include a shoulder land portion outermost in the tire axial direction, the shoulder land portion is partitioned by an auxiliary groove extending straight in the tire circumferential direction in a tread ground contact edge side into a main rib portion on the axially inside of the auxiliary groove and an auxiliary rib portion on the outside in the tire axial direction thereof, the ratio W2/W1 of a width W2 in the tire axial direction of the auxiliary rib portion and a width W1 in the tire axial direction of the main rib portion is 0.03 to 0.15.

In the heavy duty tire according to the present invention, it is preferable that the ratio D2/D1 of a depth D2 of the auxiliary groove and a depth D1 of the main groove partitioning the shoulder land portion is 0.60 to 1.00.

In the heavy duty tire according to the present invention, it is preferable that the ratio CLp/CLj of a ground contacting length CLp of an outer edge in the tire axial direction of the main rib portion and a ground contacting length CLj of an inner edge in the tire axial direction of the shoulder land portion is 0.95 to 1.05.

In the heavy duty tire according to the present invention, it is preferable that the ratio R2/R1 of the radius R2 of the 2nd circular arc and the radius R1 of the 1st circular arc is 1.50 to 1.90.

Effects of the Invention

In the heavy duty tire according to the present invention, in the state in which the distance between a pair of the bead heels is kept at 110% of the wheel rim width of the standard wheel rim and no inner pressure is applied, the contour shape of the tread portion in the tire meridian section is formed by the 1st circular arc having the center on the tire equatorial plane and a pair of the 2nd circular arcs disposed on both outsides in the tire axial direction of the 1st circular arc,
the radius R2 of the 2nd circular arc is more than the radius R1 of the 1st circular arc,
one of the 2nd circular arcs has the center on the other 2nd circular arc side of the tire equator in the tire axial direction, and
the other 2nd circular arc has the center on the one 2nd circular arc side of the tire equator in the tire axial direction.

Owing to such 2nd circular arcs, the 2nd circular arcs are positioned on the outside in the tire radial direction of an extended line of the 1st circular arc under a state applied by no inner pressure. Thereby, the shoulder dropping phenomenon caused by applying an inner pressure is prevented, and uneven wear is prevented.
Further, the 1st circular arc and the 2nd circular arcs are smoothly connected at their connecting points without having an inflection point in substance. Such smooth connection of the 1st circular arc and the 2nd circular arc is maintained after the inner pressure is applied, therefore, local slippage in the vicinity of the above-mentioned connecting point is reduced and the occurrence of uneven wear is prevented.

DESCRIPTION OF EMBODIMENTS

Embodiments of the present invention will now be described in detail in conjunction with the accompanying drawings.

Figure 1:
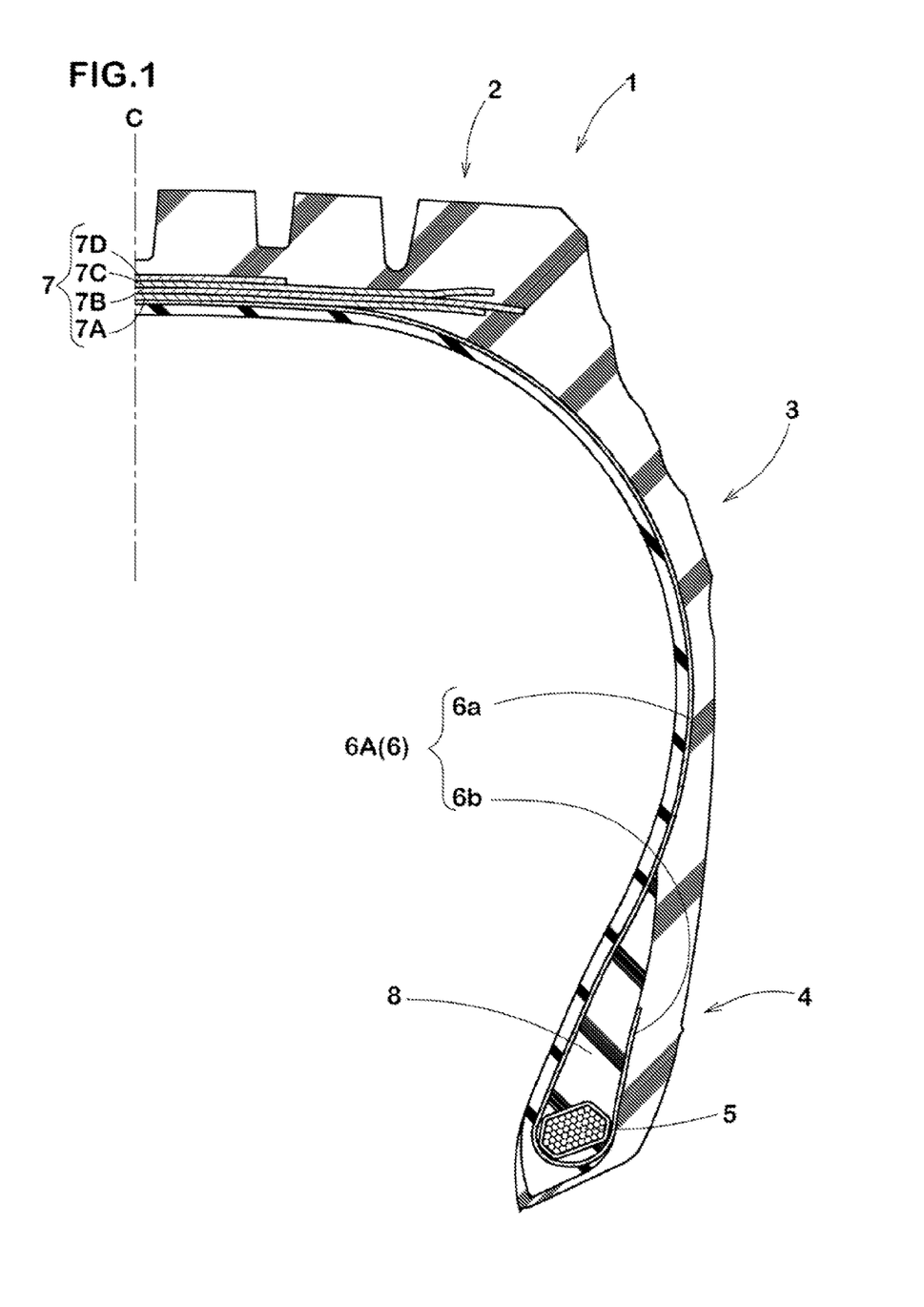
FIG. 1 is a cross sectional view showing an embodiment of the heavy duty tire of the present invention.

FIG. 1 is a tire meridian cross sectional view of a heavy duty tire 1 in this embodiment including the tire rotational axis.

As shown in FIG. 1, the heavy duty tire 1 (hereinafter, simply called "tire" depending on circumstances) in this embodiment has
a toroidal carcass 6 extending from a tread portion 2 to a bead core 5 in a bead portion 4 through a sidewall portion 3, a belt layer 7 disposed in the tread portion 2 and on the outside in the tire radial direction of the carcass 6, and a bead apex rubber 8 extending outwardly in the tire radial direction from the bead core 5 in a tapered manner.

For example, the carcass 6 is composed of a single carcass ply 6A of steel carcass cords arranged at an angle of 70 to 90 degrees with respect to the tire circumferential direction. The carcass ply 6A integrally has, at each end of a main portion 6a extending between a pair of the bead cores 5, 5, a turned up portion 6b turned up around the bead core 5 from the axially inside to outside.

The belt layer 7 is disposed on the outside in the tire radial direction of the carcass 6 and in the tread portion 2. For example, the belt layer 7 is composed of at least two belt plies of steel belt cords. There is illustrated a four-ply structure which is, in this example, composed of
a first belt ply 7A in which the belt cords are laid at an angle of 60+/−15 degrees with respect to the tire circumferential direction for example, and
second to fourth belt plies 7B to 7D which are disposed on the outside thereof and in which the belt cords are laid at small angles of 10 to 35 degrees with respect to the tire circumferential direction for example.

In the bead portion 4, there is disposed the bead apex rubber 8 extending outwardly in the tire radial direction from the bead core 5 through between the turned up portion 6b and the main portion 6a.
The bead core 5 has a core main portion in which, for example, a steel bead wire is wound in a multi-row and multi-column fashion into a polygonal cross sectional shape (for example, hexagonal cross sectional shape).

In the bead portion 4, a bead heel 4a is formed.
A distance between a pair of the bead heels 4a, 4a is 2 times a distance BW/2 from the tire equator C to the bead heel 4a, therefore, referred to by BW.

In the tread portion 2, there are formed a pair of center main grooves 9 disposed on both sides of the tire equator C and extending continuously in the tire circumferential direction, and
a pair of shoulder main grooves 10 extending continuously in the tire circumferential direction on the outside in the tire axial direction of the center main grooves 9 and on the inside of the tread ground contact edges Te.

The tread ground contact edges Te mean the axially outermost ground contact edges occurring when the tire under the normal state is ground-contacted with a flat surface at the camber angle of 0 degree and loaded with a standard load. The "normal state" is a state in which the tire mounted on a standard wheel rim is inflated to a standard inner pressure and loaded with no load.
In this application, dimensions and the like of various tire portions refer to values measured under the normal state unless otherwise noted.

The "standard wheel rim" is a wheel rim specified for the tire by a standard included in a standardization system on which the tire is based, for example, the "normal wheel rim" in JATMA, "Design Rim" in TRA, and "Measuring Rim" in ETRTO.

The "standard load" is a load specified for the tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

By a pair of the center main grooves 9 and a pair of the shoulder main grooves 10, the tread portion 2 is partitioned into a plurality of land portions.

Specifically, the tread portion 2 is partitioned into a center land portion 11 between a center main groove 9 on one side of the tire equator C and a center main groove 9 on the other side of the tire equator, a pair of middle land portions 12 between the center main grooves 9 and the shoulder main grooves 10, and a pair of shoulder land portions 13 located axially outside the shoulder main grooves 10.

When the heavy duty tire 1 is applied by an inner pressure, the tread portion 2 expands radially outwardly in the vicinity of the tire equator C.

Contrariwise, in the vicinity of the tread ground contact edges Te, the tread portion 2 (or the shoulder land portions 13) is pulled radially inwardly by the carcass 6.

As a result, the expansion of the tread portion 2 becomes different between the vicinity of the tire equator C and the vicinity of the tread ground contact edges Te.

In the heavy duty tire whose tread portion 2 has a contour shape formed by a single circular arc under a state applied by no inner pressure, as has been explained above, if the above-mentioned difference in the expansion of the tread portion 2 occurs, then the shoulder land portions 13 are positioned on the radially inside of an extended line of the circular arc of the vicinity of the tire equator c, and a shoulder dropping phenomenon is liable to occur.

In the tread portion 2 where a shoulder dropping phenomenon has occurred, the ground pressure becomes insufficient in the vicinity of the tread ground contact edge Te, and local slippage occurs in the vicinity of the tread ground contact edge Te, therefore, there is a tendency to cause uneven wear such as shoulder wear.

Further, in the ground contacting surface of the tread portion 2 during rolling of the tire, a speed difference occurs, corresponding to the difference in the outer diameter between the vicinity of the tire equator c and the vicinity of the tread ground contact edge Te, therefore, there is a tendency that the above-mentioned local slippage is furthered.

Figure 2:
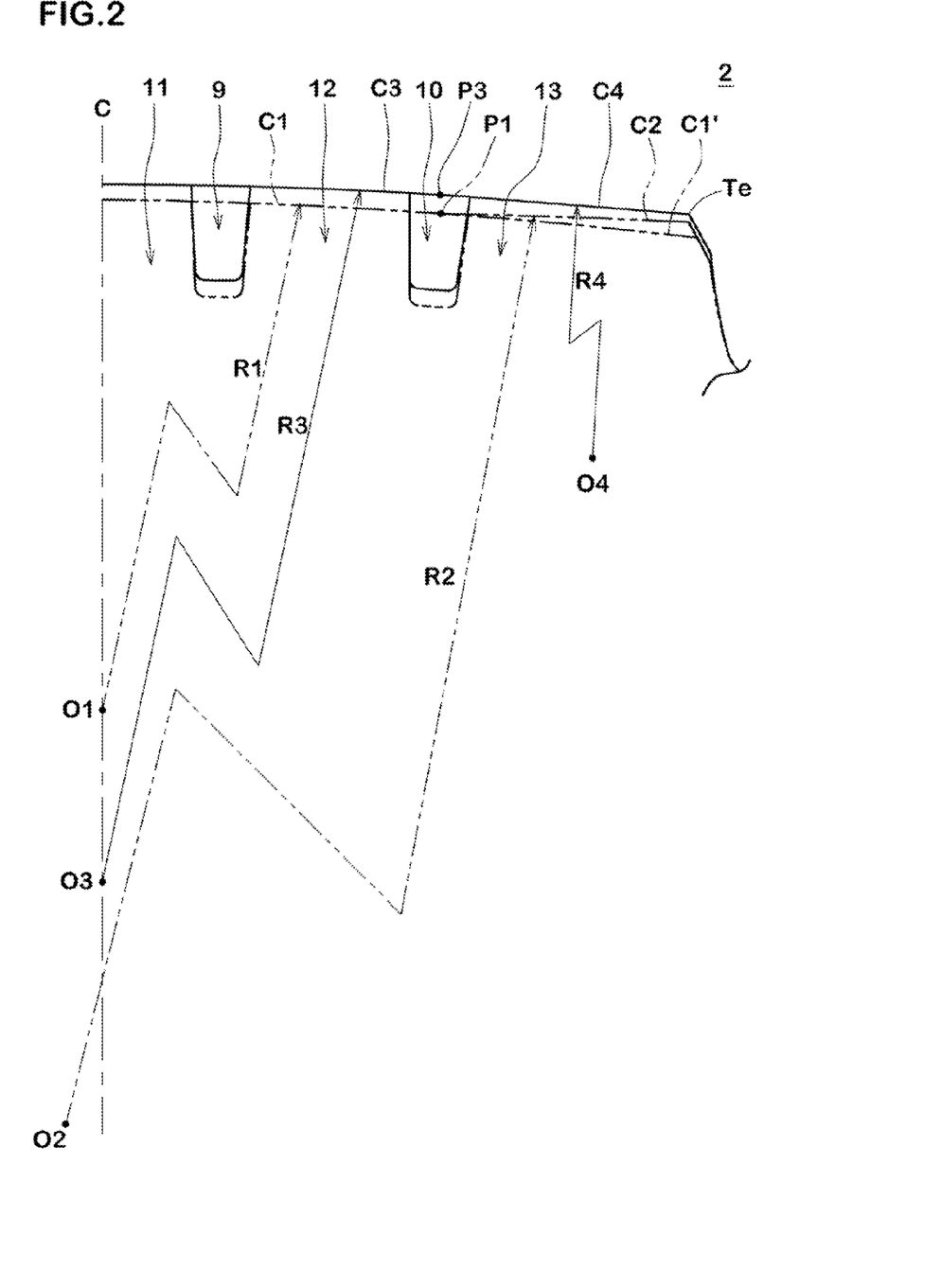
FIG. 2 is an enlarged view of a contour shape in a tire meridian section of the tread portion in FIG. 1.

In this embodiment, however, as shown in FIG. 2, the contour of the tread portion 2 is formed by the 1st circular arc C1 and a pair of the 2nd circular arcs C2, and the positions of the center O1 of the 1st circular arc C1 and the centers O2 of the 2nd circular arcs C2 are suitably defined, therefore, the shoulder dropping phenomenon due to tire inflation is remedied, and uneven wear such as shoulder wear is effectively prevented.

FIG. 2 is an enlarged view of the contour shape in a tire meridian section of the tread portion 2 of the heavy duty tire 1 in this embodiment.

In FIG. 2, imaginary lines indicated by a two-dot chain line show the tread portion 2 under a state in which a distance BW between a pair of bead heels 4a, 4a is kept at 110% of a wheel rim width of a standard wheel rim, and no inner pressure is applied (hereinafter, the no inner pressure applied state). Solid lines show the tread portion 2 of the heavy duty tire 1 under the normal state.

The contour shape of the tread portion 2 in the tire meridian section under the no inner pressure applied state is formed by the 1st circular arc C1 having the center on the tire equatorial plane C, and a pair of the 2nd circular arcs C2 disposed on both outsides of the 1st circular arc C1 in the tie axial direction.

The radii R2 of the 2nd circular arcs C2 are more than the radius R1 of the 1st circular arc C1.

The center O1 of the 1st circular arc C1 and the centers O2 of the 2nd circular arcs C2 are positioned radial inside the tread portion 2, namely, the 1st circular arc C1 and the 2nd circular arcs C2 are convex to the radially outside.

One 2nd circular arc C2 has the center O2 on the other 2nd circular arc C2 side of the tire equator C in the tire axial direction. Similarly, the other 2nd circular arc C2 has the center O2 on the one 2nd circular arc C2 side of the tire equator C.

The connecting point P1 of the 1st circular arc C1 and the 2nd circular arc C2 is preferably positioned within the shoulder main groove 10, but it may be positioned on the middle land portion 12 or the shoulder land portion 13.

By such 2nd circular arcs C2, C2, the 2nd circular arcs C2 are positioned on the radial outside of an extended line C1' of the 1st circular arc C1 under the no inner pressure applied state.

Thereby, the shoulder dropping phenomenon occurred, due to tire inflation, in the conventional tread portion whose contour shape is formed by a single circular arc is remedied, and uneven wear such as shoulder wear is effectively prevented.

Further, the 1st circular arc C1 and the 2nd circular arc C2 are connected with each other without having an inflection point in substance. Namely, the 1st circular arc C1 and the 2nd circular arc C2 are smoothly connected with each other at the connecting point P1.

As an example where the 1st circular arc C1 and the 2nd circular arc C2 are smoothly connected with each other, for example, such a case that the 1st circular arc C1 and the 2nd circular arc C2 contact with each other at the connecting point P1, in other words, P1 is a point of contact, is considered. In this case, the center O2 of the 2nd circular arc C2 is positioned on a straight line drawn between the connecting point P1 and the center O1 of the 1st circular arc C1.

Here, since the center O1 is positioned on the tire equator C, and the radius R2 of the 2nd circular arc C2 is more than the radius R1 of the 1st circular arc C1, the center O2 results in a position on the opposite side of the center O1 to the connecting point P1, namely, one 2nd circular arc C2 has the center O2 on the other 2nd circular arc C2 side of the tire equator C in the tire axial direction, and the other 2nd circular arc C2 has the center O2 on the one 2nd circular arc C2 side of the tire equator C.

If the position of the center O2 of the 2nd circular arc C2 in the tire axial direction is shifted toward the concerned 2nd circular arc C2 without changing the radius R1 and the radius R2, then the center O2 is largely deviated from the straight line drawn between the connecting point P1 and the center O1. Accordingly, the connecting point P1 becomes a tangible inflection point between the 1st circular arc C1 and the 2nd circular arc C2.

Such inflection point is remained in the contour of the tread portion 2 after the inner pressure has been applied, and there is a possibility that the inflection point becomes a starting point of uneven wear.

As shown in FIG. 2 by solid line, the contour shape in a tire meridian section of the tread portion 2 of the heavy duty tire 1 in this embodiment under the normal state is formed by a 3rd circular arc C3 having a center on the tire equatorial plane C, and a 4th circular arc C4 disposed axial outside the 3rd circular arc C3.

The center O3 of the 3rd circular arc C3 and the center O4 of the 4th circular arc C4 are positioned radially inside the tread portion 2.

The relationship between the 1st circular arc C1 and the 2nd circular arc C2 smoothly connected without having an inflection point in substance under the no inner pressure applied state as explained above, is maintained after the inner pressure is applied, and is inherited by the smooth connection between the 3rd circular arc C3 and the 4th circular arc C4. Thereby, local slippage in the vicinity of the connecting point between the 3rd circular arc C3 and the 4th circular arc C4 is reduced, and the occurrence of uneven wear such as railway wear is prevented.

The connecting point P3 between the 3rd circular arc C3 and the 4th circular arc C4 is preferably positioned within the shoulder main groove 10, but it may be positioned on the middle land portion 12 or the shoulder land portion 13.

For example, the ratio R2/R1 of the radius R2 of the 2nd circular arc C2 and the radius R1 of the 1st circular arc C1 is preferably not less than 1.20, more preferably not less than 1.50, and preferably not more than 2.20, more preferably not more than 1.90.

If the above-mentioned ratio R2/R1 is less than 1.20, then the ground pressure in the shoulder land portion 13 becomes insufficient when loaded with the standard load under the normal state. As a result, there is a possibility that local slippage is caused in the shoulder land portion 13 and shoulder wear occurs.

If the above-mentioned ratio R2/R1 exceeds 2.20, then the ground pressure in the vicinity of the tread ground contact edges Te becomes excessively high when loaded with the standard load under the normal state. As a result, there is a possibility that stepped wear occurs.

It is preferable that, under the normal state, the radius R4 of the 4th circular arc C4 is more than the radius R3 of the 3rd circular arc C3.

For example, the ratio R4/R3 of the radius R4 of the 4th circular arc C4 and the radius R3 the 3rd circular arc C3 is preferably not less than 1.05, more preferably not less than 1.10, and preferably not more than 1.25, more preferably not more than 1.20.

If the above-mentioned ratio R4/R3 is less than 1.05, then the ground pressure in the shoulder land portion 13 becomes insufficient when loaded with the standard load under the normal state. As a result, there is a possibility that local slippage is caused in the shoulder land portion 13 and shoulder wear occurs.

If the above-mentioned ratio R4/R3 exceeds 1.25, then the ground pressure in the vicinity of the tread ground contact edge Te becomes excessively high when loaded with the standard load under the normal state. As a result, there is a possibility that stepped wear occurs.

Figure 3:
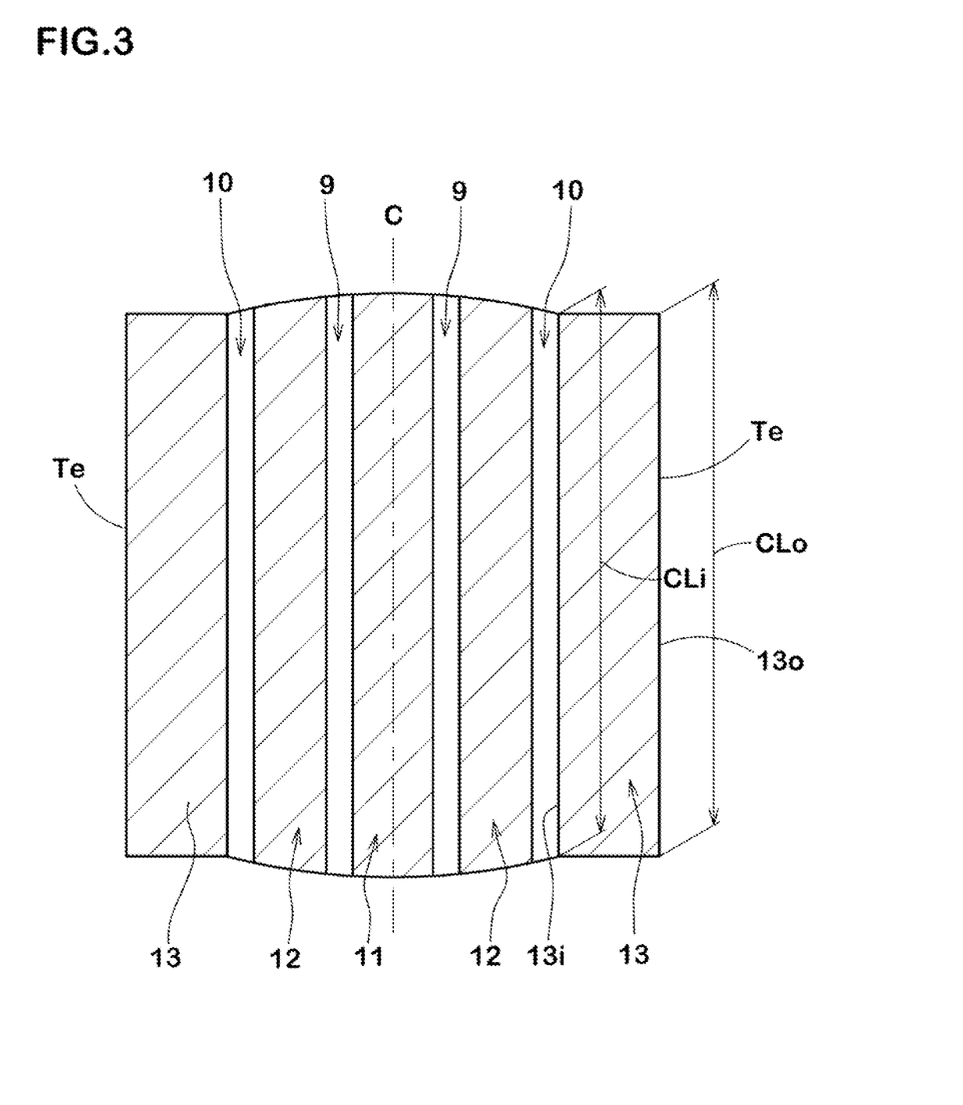
FIG. 3 is a view showing a ground contacting shape of the heavy duty tire in FIG. 1.

FIG. 3 shows a ground contacting shape of the heavy duty tire 1 which is ground-contacted with a flat surface at the camber angle of 0 degree under the normal state and loaded with the standard load.

For example, the ratio CLo/CLi of the ground contacting length CLo of the outer edge 13o in the tire axial direction of the shoulder land portion 13 and the ground contacting length CLi of the inner edge 13i in the tire axial direction of the shoulder land portion 13 is preferably not less than 0.95, more preferably not less than 0.98, and preferably not more than 1.05, more preferably not more than 1.02.

If the above-mentioned ratio CLo/CLi is less than 0.95, then the ground pressure in the vicinity of the tread ground contact edge Te becomes insufficient. As a result, there is a possibility that local slippage is caused in the vicinity of the tread ground contact edge Te, and shoulder wear occurs.

In this case, there is a possibility that the ground pressure becomes excessively high in the vicinity of the axially inner end of the shoulder land portion 13, and railway wear occurs. If the above-mentioned ratio CLo/CLi exceeds 1.05, then the ground pressure in the vicinity of the tread ground contact edge Te becomes excessively high. As a result, there is a possibility that stepped wear occurs at the tread ground contact edge Te.

Figure 4:
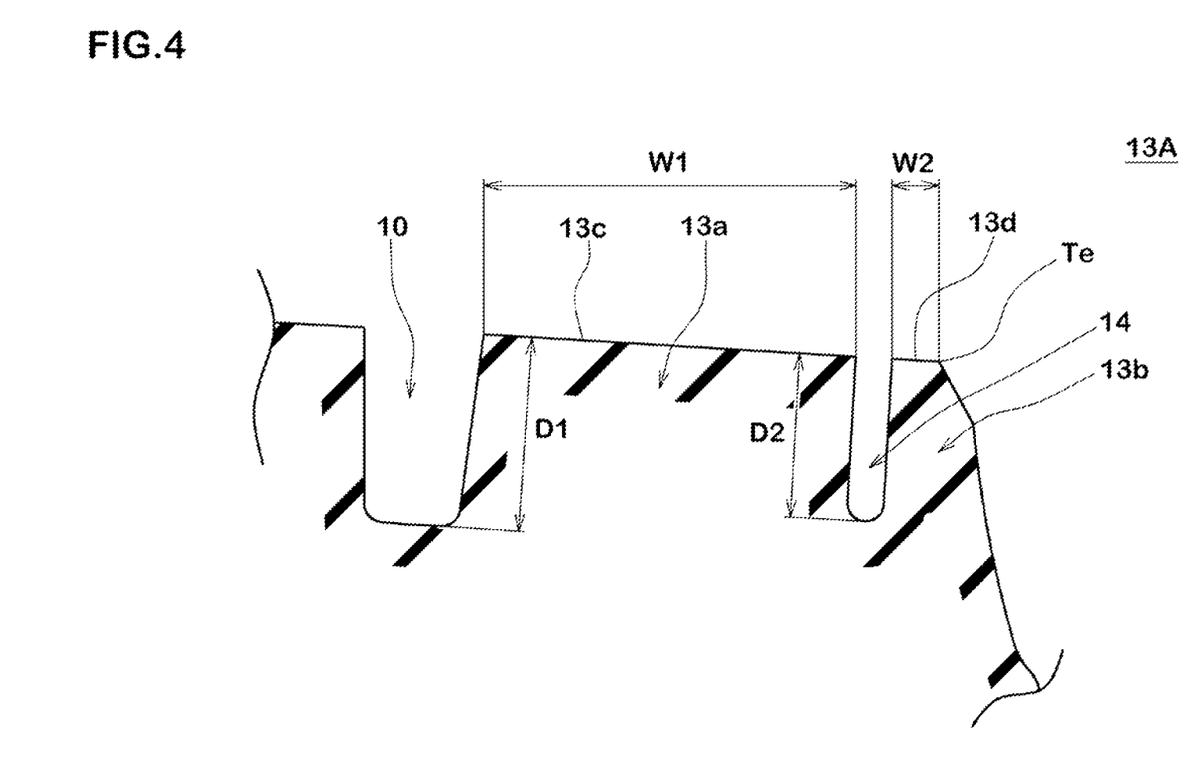
FIG. 4 is an enlarged view of a modification of the shoulder land portion in FIG. 1.

FIG. 4 shows a shoulder land portion 13A which is a modification of the shoulder land portion 13.

The shoulder land portion 13A is partitioned into a main rib portion 13a and an auxiliary rib portion 13b by an auxiliary groove 14 extending straight in the tire circumferential direction in a tread ground contact edge Te side. The main rib portion 13a is positioned axial inside the auxiliary groove 14. The auxiliary rib portion 13b is positioned axial outside the auxiliary groove 14.

The auxiliary rib portion 13b mitigates the force transmitted from the sidewall portion 3 to the shoulder land portion 13 when the sidewall portion 3 is deflected by loading. Thereby, the excessive increase of the ground pressure of the axially outer edge of the shoulder land portion 13 is prevented, and stepped wear is prevented.

For example, the ratio W2/W1 of the width W2 in the tire axial direction of the auxiliary rib portion 13b and the width W1 in the tire axial direction of the main rib portion 13a is preferably not less than 0.03, more preferably not less than 0.04, and preferably not more than 0.15, more preferably not more than 0.10.

If the above-mentioned ratio W2/W1 is less than 0.03, then there is a possibility that the rigidity of the auxiliary rib portion 13b becomes insufficient, and the auxiliary rib portion 13b is chipped off.

If the above-mentioned ratio W2/W1 exceeds 0.15, then the rigidity of the auxiliary rib portion 13b becomes excessively high, and the effect to mitigate the force transmitted from the sidewall portion 3 to the shoulder land portion 13 can not be obtained at full.

For example, the ratio D2/D1 of the depth D2 of the auxiliary groove 14 and the depth D1 of the shoulder main groove 10 is preferably not less than 0.60, more preferably not less than 0.70, and preferably not more than 1.0, more preferably not more than 0.90.

If the above-mentioned ratio D2/D1 is less than 0.60, then the rigidity of the auxiliary rib portion 13b becomes excessively high, and the effect to mitigate the force transmitted from the sidewall portion 3 to the shoulder land portion 13 can not be obtained at full.

If the above-mentioned ratio D2/D1 exceeds 1.00, then the distance between the groove bottom of the auxiliary groove 14 and the second belt ply 7B or the third belt ply 7C shown in FIG. 1 becomes insufficient, and there is a possibility that an edge of the second belt ply 7B or the third belt ply 7C is damaged.

Figure 5:
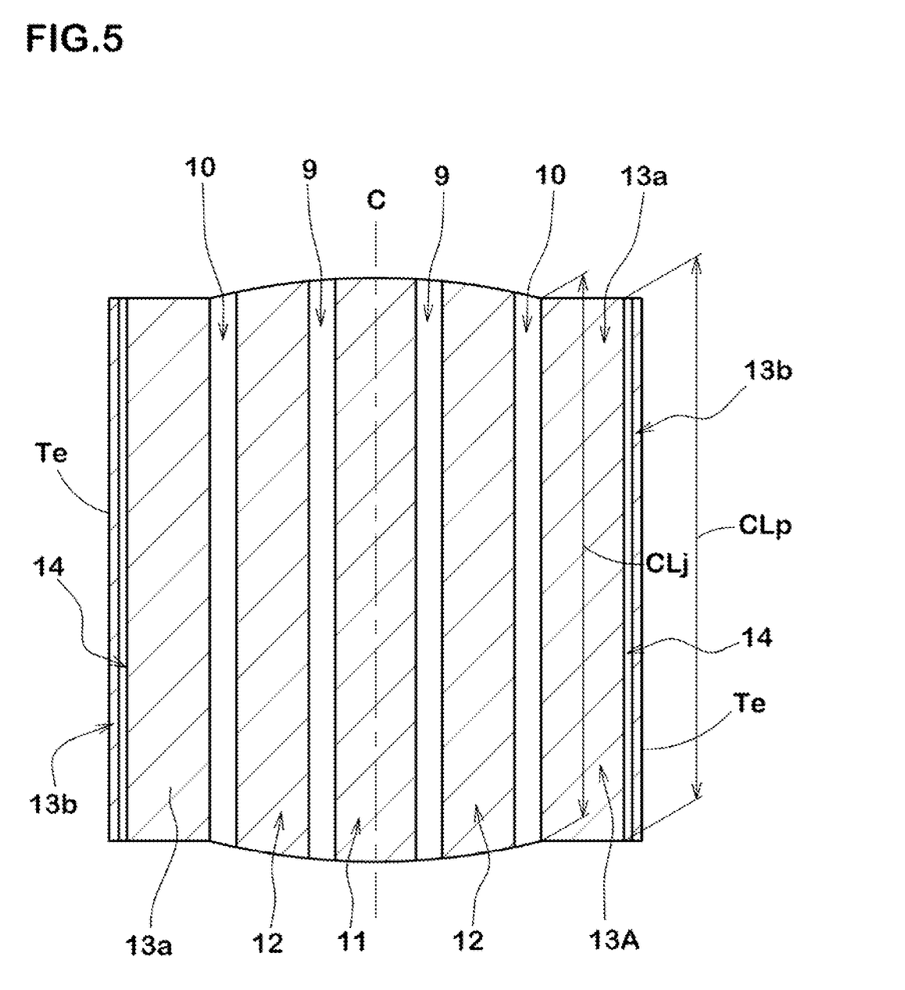
FIG. 5 is a view showing a ground contacting shape of a heavy duty tire having the shoulder land portion in FIG. 4.

FIG. 5 shows a ground contacting shape of the heavy duty tire 1 which has the shoulder land portions 13A provided with the auxiliary groove 14 and which is ground-contacted with a flat surface at the camber angle of 0 degree under the normal state and loaded with the standard load.

In the heavy duty tire 1 of which shoulder land portion 13A is provided with the auxiliary groove 14, it is preferable that the ground contacting length of the shoulder land portion 13A is assessed by the ground contacting length of the main rib portion 13a. That is, the ratio CLp/CLj of the ground contacting length CLp of the outer edge 13p in the tire axial direction of the main rib portion 13a and the ground contacting length CLj of the inner edge 13j in the tire axial direction of the main rib portion 13a is, for example, preferably not less than 0.95, more preferably not less than 0.98, and preferably not more than 1.05, more preferably not more than 1.02.

If the above-mentioned ratio CLp/CLj is less than 0.95, then the ground pressure in the vicinity of the tread ground contact edge Te becomes insufficient. As a result, there is a possibility that local slippage occurs in the vicinity of the tread ground contact edge Te, and shoulder wear occurs.
In this case, further, there is a possibility that the ground pressure in the vicinity of the axially inner end of the shoulder land portion 13A becomes excessively high, and railway wear occurs.
If the above-mentioned ratio CLp/CLj exceeds 1.05, then the ground pressure in the vicinity of the tread ground contact edge Te becomes excessively high. As a result, there is a possibility that stepped wear occurs at the tread ground contact edge Te.

While description has been made of embodiments of the present invention, the present invention should not be limited to these embodiments; it is possible to carry out the invention by changing into various embodiments.

Embodiments

Heavy duty tires of size 12R22.5 having the basic structure shown in FIG. 1 were experimentally manufactured according to specifications listed in Table 1 and tested for uneven wear resistance. The test method is as follows.

<Uneven Wear Resistance>

The test tire mounted on a 8.25×22.5J wheel rim and inflated to 800 kPa was installed on a ten-ton truck, and the truck loaded with its full carrying capacity was run until the wear reached to 30%. Thereafter, occurrences of the shoulder wear, stepped wear and railway wear in the shoulder portions were visually measured and evaluated by a five point method, wherein the value of Embodiment 1 is 5 points, and the larger the numerical value, the better the resistance to each uneven wear.

TABLE 1

|  | comparative example 1 | comparative example 2 | comparative example 3 | embodiment 1 | embodiment 2 | embodiment 3 |
|---|---|---|---|---|---|---|
| R1 (mm) | 700 | 700 | 700 | 700 | 700 | 700 |
| R2 (mm) | 700 | 1200 | 1200 | 1200 | 840 | 1050 |
| R2/R1 | 1.00 | 1.71 | 1.71 | 1.71 | 1.20 | 1.50 |
| position of center O2 of one 2nd circular arc | on equator | on equator | one 2nd circular arc side | the other 2nd circular arc side | the other 2nd circular arc side | the other 2nd circular arc side |
| position of center O2 of the other 2nd circular arc | on equator | on equator | the other 2nd circular arc side | one 2nd circular arc side | one 2nd circular arc side | one 2nd circular arc side |
| R4/R3 | 1.15 | 1.15 | 1.15 | 1.15 | 1.15 | 1.15 |
| CLo/CLi | 0.80 | 0.90 | 0.85 | 1.00 | 1.00 | 1.00 |
| resistance to shoulder wear (marks) | 1 | 3 | 2 | 5 | 3 | 4 |
| resistance to stepped wear (marks) | 5 | 3 | 4 | 5 | 5 | 5 |
| resistance to railway wear (marks) | 2 | 3 | 3 | 5 | 5 | 5 |

|  | embodiment 4 | embodiment 5 | embodiment 6 | embodiment 7 | embodiment 8 | embodiment 9 |
|---|---|---|---|---|---|---|
| R1 (mm) | 700 | 700 | 700 | 700 | 700 | 700 |
| R2 (mm) | 1330 | 1540 | 1610 | 1200 | 1200 | 1200 |
| R2/R1 | 1.90 | 2.20 | 2.30 | 1.71 | 1.71 | 1.71 |
| position of center O2 of one 2nd circular arc | the other 2nd circular arc side | the other 2nd circular arc side | the other 2nd circular arc side | the other 2nd circular arc side | the other 2nd circular arc side | the other 2nd circular arc side |
| position of center O2 of the other 2nd circular arc | one 2nd circular arc side | one 2nd circular arc side | one 2nd circular arc side | one 2nd circular arc side | one 2nd circular arc side | one 2nd circular arc side |
| R4/R3 | 1.15 | 1.15 | 1.15 | 1.00 | 1.05 | 1.10 |
| CLo/CLi | 1.00 | 1.00 | 1.00 | 1.00 | 1.00 | 1.00 |
| resistance to shoulder wear (marks) | 5 | 5 | 5 | 3 | 4 | 5 |
| resistance to stepped wear (marks) | 5 | 4 | 3 | 5 | 5 | 5 |
| resistance to railway wear (marks) | 5 | 5 | 5 | 5 | 5 | 5 |

|  | embodiment 10 | embodiment 11 | embodiment 12 | embodiment 13 | embodiment 14 | embodiment 15 |
|---|---|---|---|---|---|---|
| R1 (mm) | 700 | 700 | 700 | 700 | 700 | 700 |
| R2 (mm) | 1200 | 1200 | 1200 | 1200 | 1200 | 1200 |
| R2/R1 | 1.71 | 1.71 | 1.71 | 1.71 | 1.71 | 1.71 |
| position of center O2 of one 2nd circular arc | the other 2nd circular arc side | the other 2nd circular arc side | the other 2nd circular arc side | the other 2nd circular arc side | the other 2nd circular arc side | the other 2nd circular arc side |

TABLE 1-continued

|  | | | | | | |
|---|---|---|---|---|---|---|
| position of center O2 of the other 2nd circular arc | one 2nd circular arc side | one 2nd circular arc side | one 2nd circular arc side | one 2nd circular arc side | one 2nd circular arc side | one 2nd circular arc side |
| R4/R3 | 1.20 | 1.25 | 1.30 | 1.15 | 1.15 | 1.15 |
| CLo/CLi | 1.00 | 1.00 | 1.00 | 0.90 | 0.95 | 0.98 |
| resistance to shoulder wear (marks) | 5 | 5 | 5 | 3 | 4 | 5 |
| resistance to stepped wear (marks) | 5 | 4 | 3 | 5 | 5 | 5 |
| resistance to railway wear (marks) | 5 | 5 | 5 | 3 | 4 | 5 |

|  | embodiment 16 | embodiment 17 | embodiment 18 |
|---|---|---|---|
| R1 (mm) | 700 | 700 | 700 |
| R2 (mm) | 1200 | 1200 | 1200 |
| R2/R1 | 1.71 | 1.71 | 1.71 |
| position of center O2 of one 2nd circular arc | the other 2nd circular arc side | the other 2nd circular arc side | the other 2nd circular arc side |
| position of center O2 o the other 2nd circular arc | one 2nd circular arc side | one 2nd circular arc side | one 2nd circular arc side |
| R4/R3 | 1.15 | 1.15 | 1.15 |
| CLo/CLi | 1.02 | 1.05 | 1.10 |
| resistance to shoulder wear (marks) | 5 | 5 | 5 |
| resistance to stepped wear (marks) | 5 | 4 | 3 |
| resistance to railway wear (marks) | 5 | 5 | 5 |

As apparent from Table 1, it was confirmed that, in comparison with the comparative examples, the embodiments of the heavy duty tires were significantly improved in the resistance to shoulder wear, the resistance to stepped wear and the resistance to railWay wear in a well balanced manner.

REFERENCE SIGNS LIST 1 heavy duty tire
2 tread portion
4a bead heel
7 belt layer
C1 1st circular arc
C2 2nd circular arc
C3 3rd circular arc
C4 4th circular arc
13 shoulder land portion
13a main rib portion
13b auxiliary rib portion
13i inner edge
13o outer edge
14 auxiliary groove

The invention claimed is:

1. A heavy duty tire having
a carcass extending from a tread portion to bead cores in bead portions through sidewall portions, and
a belt layer composed of a plurality of belt plies disposed in the tread portion and on the outside of the carcass in the tire radial direction,
wherein
in a state in which a distance between a pair of bead heels of the tire is kept at 110% of a wheel rim width of a standard wheel rim and no inner pressure is applied,
a contour shape of the tread portion in a tire meridian section consists of a 1st circular arc having a center on the tire equatorial plane, and a pair of 2nd circular arcs located one on each side of the 1st circular arc in the tire axial direction, and
one of the 2nd circular arcs has a center on the other 2nd circular arc side of the tire equator in the tire axial direction, and the other 2nd circular arc has a center on said one 2nd circular arc side of the tire equator in the tire axial direction,
the 1st circular arc is connected to the 2nd circular arcs smoothly at connecting points from which the 2nd circular arcs extend to respective tread edges, and
a ratio R2/R1 of a radius R2 of the 2nd circular arcs to a radius R1 of the 1st circular arc is 1.50 to 2.20,
in a normal state in which the tire is mounted on the standard wheel rim, inflated to a standard inner pressure and loaded with no tire load,
a contour shape the tread portion in a tire meridian section consists of a 3rd circular arc having a center on the tire equatorial plane, and a pair of 4th circular arcs located one on each side of the 3rd circular arc in the tire axial direction,
the 3rd circular arc is connected to the 4th circular arcs smoothly at connecting points from which the 4th circular arcs extend to the respective tread edges, and
a ratio R4/R3 of a radius R4 of the 4th circular arcs to a radius R3 of the 3rd circular arc is 1.05 to 1.25.

2. The heavy duty tire according to claim 1, wherein
the tread portion is partitioned by a plurality of main grooves extending in the tire circumferential direction into a plurality of land portions including an axially outermost shoulder land portion, and
when the tire is mounted on the standard wheel rim and applied by the standard inner pressure is ground-contacted with a flat surface at the camber angle of 0 degree and loaded by a standard load,
the ratio CLo/CLi of a ground contacting length CLo of an outer edge in the tire axial direction of the shoulder land portion and a ground contacting length CLi of an inner edge in the tire axial direction of the shoulder land portion is 0.95 to 1.05.

3. The heavy duty tire according to claim 1, wherein
the tread portion is partitioned by a plurality of main grooves extending continuously in the tire circumferential direction into a plurality of land portions including axially outermost shoulder land portions, each said shoulder land portion is partitioned by an auxiliary groove extending straight continuously in the tire circumferential direction into a main rib portion on the inside of the auxiliary groove in the tire axial direction, and an auxiliary rib portion on the outside of the auxiliary groove in the tire axial direction, and the ratio W2/W1 of a width W2 of the auxiliary rib portion in the tire axial direction and a width W1 of the main rib portion in the tire axial direction is 0.03 to 0.15.

4. The heavy duty tire according to claim 3, wherein
the ratio D2/D1 of a depth D2 of the auxiliary groove and a depth D1 of the main groove partitioning the shoulder land portion is 0.60 to 1.00.

5. The heavy duty tire according to claim 3, wherein
when the tire is mounted on the standard wheel rim and applied by the standard inner pressure is ground-contacted with a flat surface at the camber angle of 0 degree and loaded by a standard load, the ratio CLp/CLj of a ground contacting length CLp of an outer edge in the tire axial direction of the main rib portion and a ground contacting length CLj of an inner edge in the tire axial direction of the shoulder land portion is 0.95 to 1.05.

6. The heavy duty tire according to claim 1, wherein
the ratio R2/R1 of the radius R2 of the 2nd circular arc and the radius R1 of the 1st circular arc is 1.50 to 1.90.

7. The heavy duty tire according to claim 4, wherein
when the tire is mounted on the standard wheel rim and applied by the standard inner pressure is ground-contacted with a flat surface at the camber angle of 0 degree and loaded by a standard load, the ratio CLp/CLj of a ground contacting length CLp of an outer edge in the tire axial direction of the main rib portion and a ground contacting length CLj of an inner edge in the tire axial direction of the shoulder land portion is 0.95 to 1.05.

* * * * *